United States Patent [19]

Chauvigné

[11] 3,972,344
[45] Aug. 3, 1976

[54] VALVE FOR WATER SPRINKLERS AND THE LIKE

[75] Inventor: Michel Chauvigné, Cluses, France

[73] Assignee: Establissements Carpano & Pons, France

[22] Filed: Dec. 31, 1974

[21] Appl. No.: 537,765

[30] Foreign Application Priority Data
Jan. 21, 1974 France .............................. 74.01955

[52] U.S. Cl. ........................... 137/119; 137/624.14; 239/66; 137/625.44
[51] Int. Cl.² ...................... A01G 25/00; B05B 9/00
[58] Field of Search ............. 137/118, 119, 625, 98, 137/115, 610, 120, 121, 624.14, 625.44, 467; 239/66

[56] References Cited
UNITED STATES PATENTS
1,205,408  11/1916  Suren ................................. 137/118
3,667,498  6/1972  Mizuno .............................. 137/119
3,872,877  3/1975  Branson ............................. 137/118

FOREIGN PATENTS OR APPLICATIONS
47-2818  5/1968  Japan ................................. 137/119

*Primary Examiner*—Martin P. Schwadron
*Assistant Examiner*—Robert J. Miller
*Attorney, Agent, or Firm*—Robert E. Burns; Emmanuel J. Lobato; Bruce L. Adams

[57] ABSTRACT

A valve for water sprinklers and the like, with an inlet and first and second outlets, has a hinged clapper biased to close the second outlet but held closing the first outlet by a dosing device after delivery of a given volume of liquid through the first outlet. The dosing device includes a chamber communicating with the inlet via a flow regulator. Filling of the chamber with liquid moves a piston extended by a rod cooperating with the clapper.

7 Claims, 4 Drawing Figures

FIG_1

FIG_2

VALVE FOR WATER SPRINKLERS AND THE LIKE

BACKGROUND OF THE INVENTION

The invention concerns valves of the type which control the dispensing of a liquid in spraying installations, such as water sprinkling or underground watering installations, for lawn sprinkling, irrigation and other purposes such as filling of watering troughs.

SUMMARY OF THE INVENTION

According to the invention, a valve assembly for water sprinkling and the like liquid distributing systems comprises a valve body having an inlet and first and second outlets, a valve member such as a clapper able to close one of the outlets and simultaneously open the other, spring means biasing the valve member to close the second outlet and open the first, and volumetric dosing means for actuating the valve member to close the first outlet and open the second outlet after passage of a given volume of liquid through the first outlet, said dosing means comprising: means including a piston defining a dosing chamber, means communicating the dosing chamber with the inlet for allowing the flow of a fraction of the liquid from the inlet into the dosing chamber, said piston being movable from a first position to a second position in response to delivery into the dosing chamber of a given quantity of liquid, and an element such as a rod movable with the piston between said first and second positions, in which first position of said movable element the valve member is free to close the second outlet under the action of said spring means, and in which second position said movable element holds the valve member against the action of said spring means to close said first outlet.

The second outlet may be connected by a pipe to the inlet of a second similar valve whose first outlet is open when the first outlet of the first dispenser is closed. The second outlet and the inlet may advantageously be disposed in extension of one another, the section of the second outlet being at least equal to that of the inlet, in such a manner that the head loss in the valve is as small as possible when the liquid flows through the second outlet. Several valves may thus be fed, not simultaneously, but successively, without the head loss being appreciable, as each valve is opened at the moment when the preceding one closes.

According to a varied embodiment, the valve assembly according to the invention includes a device enabling acceleration of closing of the first outlet at the moment of closing the valve member or clapper of the first outlet, to provide a "clean" closure of this clapper. To this end, the inlet is able to communicate with the dosing chamber by a duct of greater section than that of a flow reducer providing the "normal" communication between the inlet and the dosing chamber, this duct being normally closed by a second clapper biased at rest into a closed position under the action of a spring. During the last part of the stroke of the piston, into the second position, the second clapper is kinematically connected to the piston to open said duct.

According to another varied embodiment, the valve assembly according to the invention includes, disposed between the inlet and the chamber, a non-return valve enabling the passage of liquid in only one direction, from the chamber towards the inlet. The passage of liquid from the chamber towards the inlet is hence facilitated and accelerated so as to permit accelerated opening of the first outlet, and simultaneous closing of the second outlet at the moment when the pressure of the liquid is lower in the inlet than in the chamber, e.g. when, once dispensing of the liquid has terminated, the pressure of the liquid supplied is lowered substantially to atmospheric pressure.

BRIEF DESCRIPTION OF THE DRAWINGS

The accompanying drawings show, by way of example, an embodiment of a valve assembly according to the invention. In the drawings.

DESCRIPTION OF THE PREFERRED EMBODIMENTS

Figure 1:
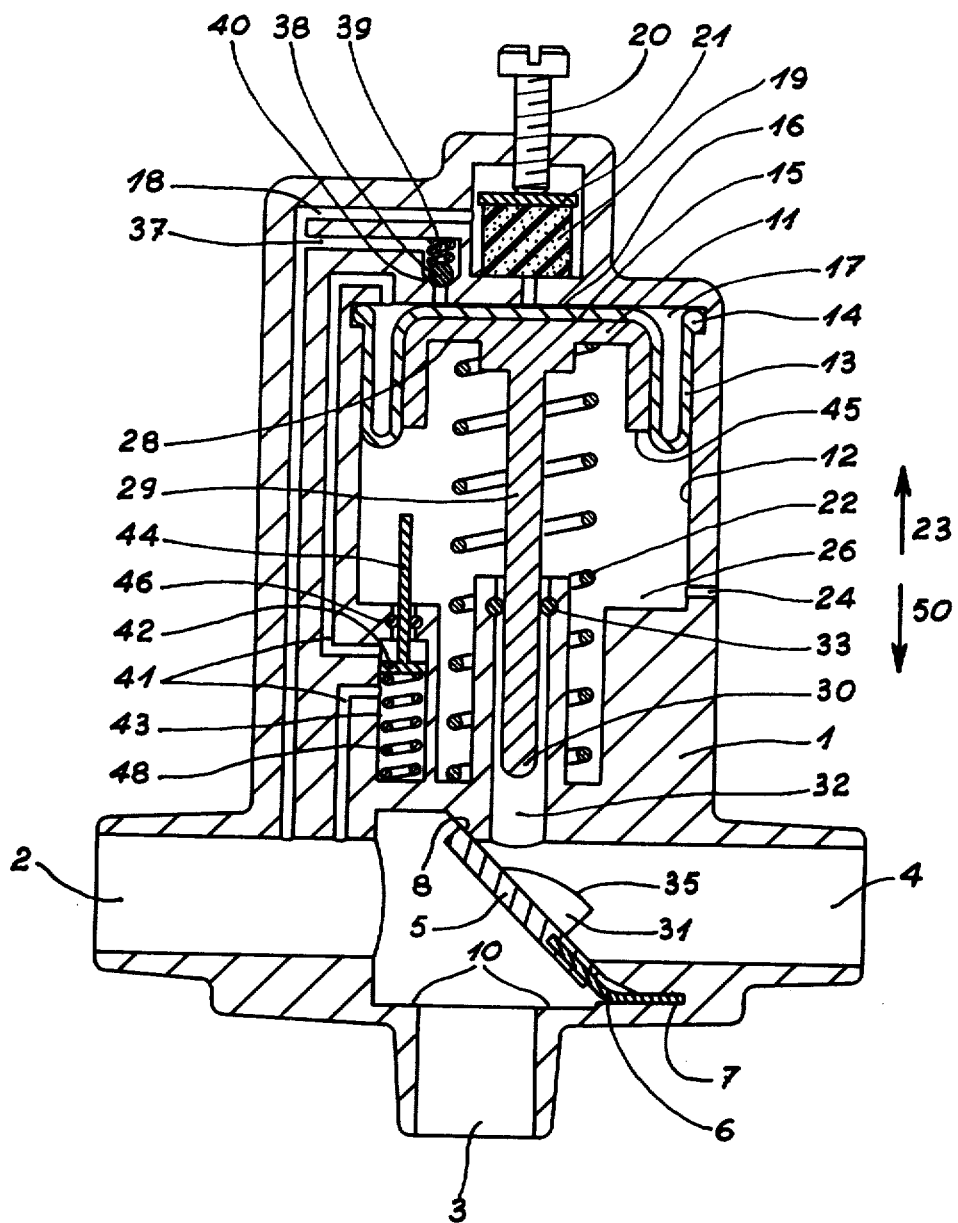
FIG. 1 is a cross-section of a valve assembly in a rest position, the first outlet being open.

As shown in FIG. 1, the liquid dispensing valve has a body 1 with an inlet port 2, a first outlet port 3 and a second outlet port 4. These three ports have substantially identical cross-sectional areas, the ports 4 and 2 being disposed in extension of one another. A valve clapper 5 is hinged to body 1 at 6 by means of an elastic element 7 which biases clapper 5 to a rest position against a seat 8, to open port 3 and close port 4. The clapper can also be applied against a second seat 10 on port 3, to close port 3 and simultaneously open port 4.

The valve additionally includes a volumetric dosing device including a piston 11 fluid-tightly mounted in a cylinder 12 by means of a membrane 13 whose periphery 14 is fixed to the cylinder and whose central part bears against a first face 15 of piston 11. Membrane 13 defines, with an end 16 of the cylinder, a dosing chamber 17 permanently connected to the inlet port 2 by a duct 18 and a flow reducer or regulator formed by a block 19 of open cellular foam, for example elastomeric, which may be compressed to a greater or lesser degree by a setting screw 20 acting on a washer 21. A spring 22 biases the piston 11 according to arrow 23. An orifice 24 places the end 26 of cylinder 12, opposite to face 16, constantly in communication with the exterior.

The second face 28 of the piston, opposite the first, has a protruding integral element in the form of a rod 29 whose end 30 is disposed facing a rib 31 on clapper 5. Rod 29 is slidably mounted in a rectilinear housing 32 with a sealing joint 33. The length of rod 29 is such that when the piston 11 is in the position of FIG. 3, the rod 29 acts on rib 31, to hold clapper 5 against seat 10. The rib 31 advantageously has a cam profile 35 able to amplify movement of the end 30 of rod 29.

Chamber 17 is able to communicate with the inlet port 2 by a duct 41 of having the same cross-sectional area as duct 18 (but effectively greater because of the flow regulator). Opening of duct 41 is controlled by a clapper 42 slidably mounted in a cylinder 43 and carrying a rod 44, parallel to rod 29, whose end projects into cylinder 12, in the trajectory of a flange 45 of piston 11. Sealing between the rod 44 and the end 26 of cylinder 12 is provided by a joint 46. Clapper 42 and its rod 44 are biased according to arrow 23 by a spring 48 into a rest position closing duct 41. The length of rod 44 is such that, during the last part of the stroke of piston 11 according to arrow 50, the flange 45 of piston 11 comes into contact with the end of rod 44 (FIG. 2) and moves the clapper 42 to open duct 41.

Chamber 17 is also able to communicate with inlet port 2 by a duct 37 provided with a one-way valve formed by a ball 38 biased by a spring 39 against a seat 40, which allows flow of liquid only from chamber 17 towards the port 2 when the pressure of the liquid in port 2 is less than that in chamber 17.

FIG. 1 shows the components of the valve in the rest position, i.e. when the pressure of the liquid in the inlet port is less than or substantially equal to atmospheric pressure. In this position, the piston 11 bears against the end 16 of cylinder 12. Port 3 is open and port 4 closed by clapper 5. The clapper 42 closes the duct 41 and the ball 38 of the one-way valve closes duct 37.

When the liquid entering port 2 is at a pressure greater than atmospheric pressure (by more than the pressure exerted by spring 22), the liquid flows through the open port 3 and, at the same time, penetrates into duct 18 and passes through the foam block 19 of the flow regulator into chamber 17. The piston 11 moves at a speed which depends on the preset adjustment of the flow regulator; flow of liquid through the foam block 19 is slower the more the block 19 is compressed by the screw 20. The slower the speed of piston 11, the greater is the volume of liquid dispensed through port 3 before closure thereof.

Figure 2:
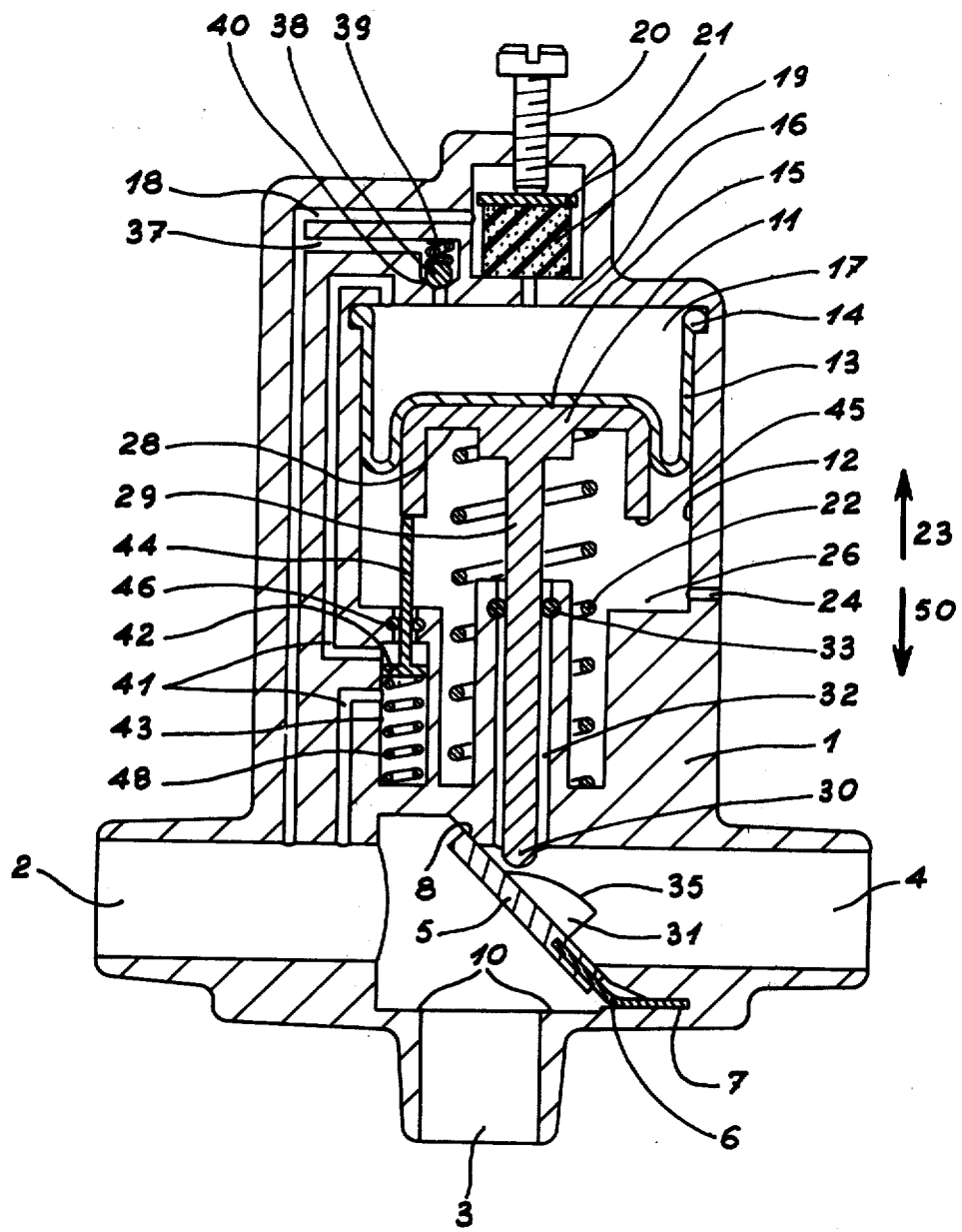
FIG. 2 is a similar view, with the piston in an intermediate position.

As shown in FIG. 2, after the main part of the stroke of piston 11 according to arrow 50, when the flange 45 of piston 11 comes into contact with the end of rod 44, clapper 42 is also pushed according to arrow 50. After a given path, the clapper 42 opens duct 41 to allow the liquid under pressure to rapidly pass from port 2 into the chamber 17. Consequently, the piston 11 is accelerated. At the same time, the end 30 of rod 29 comes into contact with the profile 35 of rib 31, whereupon the clapper 5 is moved rapidly to come to apply against seat 10, thereby closing port 3 and simultaneously opening port 4.

Figure 3:
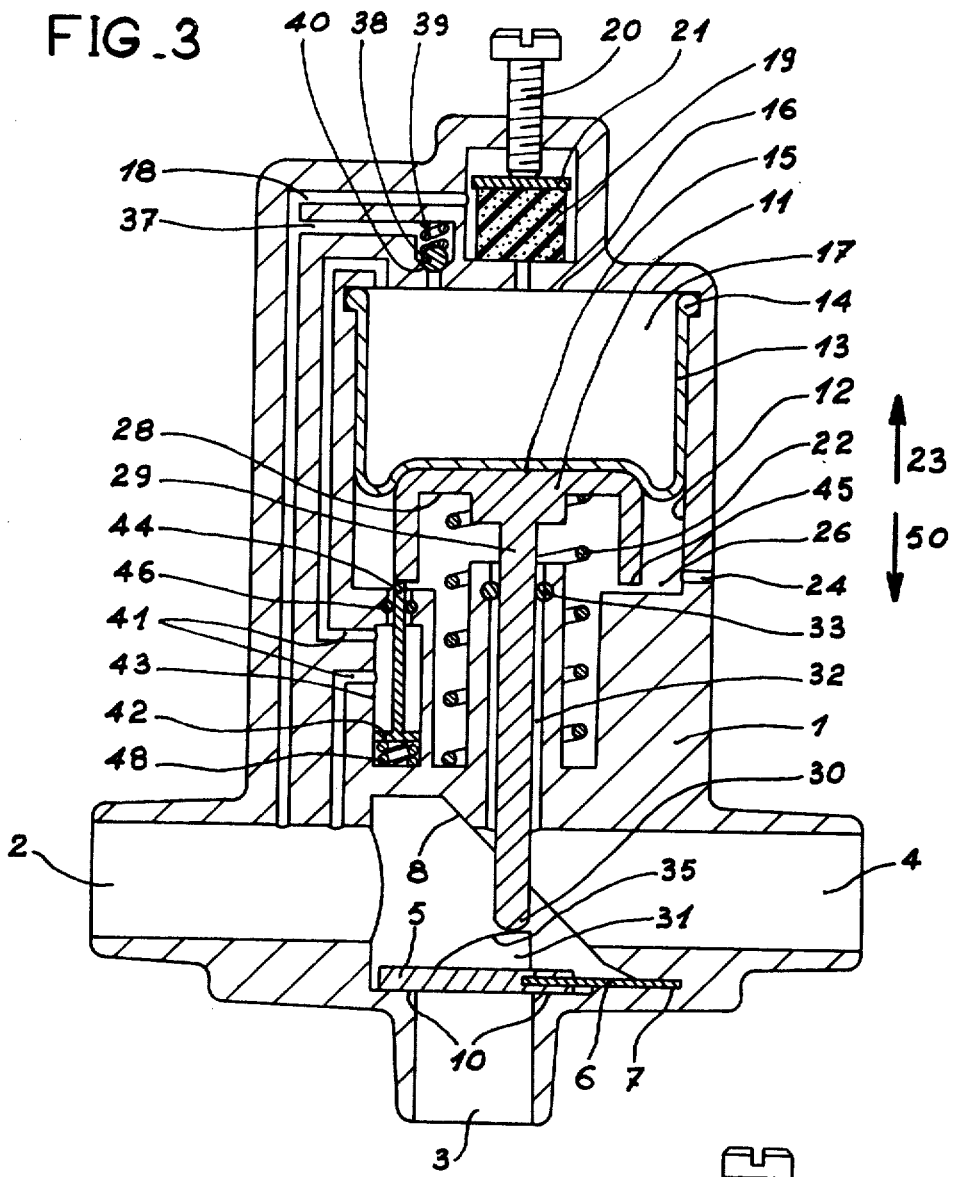
FIG. 3 is a similar view, but with the first outlet closed.

In the position of FIG. 3, taking into account that port 4 has a cross-sectional area equal to that of the inlet port 2 and that it is disposed in extension thereof, the flow of liquid through the valve involves practically no head loss. The liquid can thus be used to supply another similar valve whose inlet port is connected to port 4 of the first valve.

To return the valve to the rest state when the flow of liquid is interrupted inside the valve, it is necessary to reduce the pressure of liquid in the piping connecting the inlet port to the source of liquid to a value less than or equal to atmospheric pressure by means external to the valve.

At the moment when the pressure in the inlet port 2 is thus reduced, the various components of the valve occupy the positions shown in FIG. 3. The chamber 17 initially communicates with port 2 by duct 41 so that the pressure in chamber 17 becomes less than that exerted by spring 22, and piston 11 moves according to arrow 23, its rod 29 freeing clapper 5 which eventually comes to be applied against seat 8 under the action of the elastic element 7. Port 4 is thus closed and port 3 open.

During the movement of piston 11 according to arrow 23, the rod 44 of clapper 42 is freed and duct 41 thus closed. The pressure in chamber 17 then remains stationary until the pressure in the inlet port 2 and duct 37 has dropped sufficiently low for ball 38 to compress its spring 39 and open the one-way valve to place chamber 17 into communication with port 2 via duct 37. The piston 11 and the clapper 42 may then reassume the rest position shown in FIG. 1, in which the valve is ready for another operation.

Figure 4:
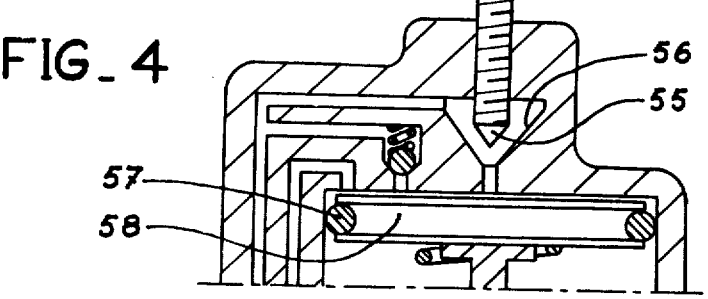
FIG. 4 is a cross-section of a part of a varied embodiment of valve assembly.

According to FIG. 4, the flow regulator may a needle valve formed by an adjustment screw with a conical head 55 cooperating with a seat 56 of corresponding shape. As before, this flow regulator enables an adjustment of the flow of liquid into chamber 17 at will. Another variation shown in FIG. 4 is that sealing between the piston and the cylinder is provided by a joint 57 lodged in a groove of the piston 58. Operation of this varied embodiment is identical to that of the described embodiment (FIGS. 1 to 3).

Valves according to the invention may in particular be used with a source delivering a limited flow of liquid to supply several valves without a substantial head loss; this problem is encountered with spraying installations, such as sprinkling and underground watering installations, and with similar installations such as for the filling of watering troughs.

What is claimed is:

1. A valve assembly for water sprinkling and the like liquid distributing systems, comprising a valve body having an inlet and first and second outlets, a valve member able to close one of the outlets and simultaneously open the other, spring means biasing the valve member to close the second outlet and open the first, and volumetric dosing means for actuating the valve member to close the first outlet and open the second outlet after passage of a given volume of liquid through the first outlet, said dosing means comprising: means including a piston defining a dosing chamber, means providing communication between the dosing chamber and the inlet for allowing the flow of a fraction of the liquid from the inlet into the dosing chamber, said piston being reciprocable from a first position to a second position in response to delivery into the dosing chamber of a given quantity of liquid, and an element movable with the piston upon travel thereof between said first and second positions, in which first position of said movable element the valve member is free to close the second outlet under the action of said spring means, and in said second position said movable element engages said valve member and holds the valve member against the action of said spring means to close said first outlet.

2. A valve assembly according to claim 1, in which said means providing communication between said chamber and the inlet comprises a first duct, means for regulating the flow through the first duct, means defining a second duct, and a clapper movable from a first position closing the second duct to a second position opening the second duct, means on the clapper cooperating with the piston to be moved to its second position in response to movement of the piston into its second position.

3. A valve assembly according to claim 1, in which said means providing communication between said chamber and the inlet comprises a first duct, means for regulating the flow through the first duct, means defining a second duct providing communication between the inlet and the dosing chamber, and a one-way valve allowing liquid to flow through said second duct only from the dosing chamber towards the inlet.

4. A valve assembly according to claim 1, in which said means providing communication between said chamber and the inlet comprises a duct, and regulating means for regulating the flow of liquid through said duct, said regulating means comprising a block of open cellular foam material, and means for selectively compressing said block.

5. A valve assembly for a sprinkling system and the like comprising, a valve body having a water inlet and a first and a second outlet, a valve member operable to close one of the outlets and simultaneously close the other outlet, spring means biasing the valve member to close the second outlet and open the first outlet, actuating means for actuating the valve member to close the first outlet and open the second outlet after passage of a given volume of liquid though the first outlet comprising means including a piston defining a chamber, means defining a duct providing communication between the inlet and said chamber for flowing liquid into said chamber, said piston being operable to a first operative position free of said valve member to allow control of said valve member by said spring means and operable to a second operative position under control of liquid under pressure in said chamber for urging the valve member to close the first outlet and open the second outlet, resilient means biasing the piston to said first operative means defining a one-way second duct providing communication between said chamber and said inlet, a valve in said second duct biased to a position interrupting flow of liquid through said second duct, a control element connected to said piston for actuating said valve under control of said piston during movement of said piston from said first position to said second position to allow flow of liquid from said inlet to said chamber thereby to increase liquid flow into said chamber and accelerate travel of said piston to said second operative position.

6. A valve assembly for a sprinkling system and the like according to claim 5, including a regulator valve for variably controlling the volume of flow of liquid through said first duct into said chamber.

7. A valve assembly for a sprinkling system and the like according to claim 6, in which said regulator valve comprises a porous member through which said liquid flows into said chamber, and means to vary the porosity of said porous member.

* * * * *